United States Patent Office 2,923,607
Patented Feb. 2, 1960

2,923,607

PROCESS OF SEPARATING ZIRCONIUM VALUES FROM HAFNIUM VALUES BY SOLVENT EXTRACTION WITH AN ALKYL PHOSPHATE

Donald F. Peppard, Chicago, Ill., assignor to the United States of America as represented by the United States Atomic Energy Commission No Drawing. Application June 25, 1952
Serial No. 295,546

17 Claims. (Cl. 23—312)

The process of this invention deals with the recovery of zirconium values and/or hafnium values from aqueous solutions by solvent extraction, and in particular with the separation of zirconium values from hafnium values associated therewith.

Most zirconium ores contain hafnium which is difficult to separate from the zirconium because of the similarity in the chemical properties of these two elements. Consequently, technical grade zirconium salts are usually contaminated by hafnium salts; in particular is this true for the zirconyl chloride and zirconyl nitrate, the salts mostly obtained in the processes used for the decomposition and dissolution of the zirconium ores.

For a great many uses of zirconium salt, e.g. for the metal production, a high degree of purity is required; high purity hafnium products are also of great interest. It was therefore desirable to devise a process by which the zirconium and hafnium usually associated with each other can be readily and efficiently separated.

It is an object of this invention to provide a process for the recovery of zirconium values from aqueous solutions by which a high yield is obtained.

It is another object of this invention to provide a process for the practically complete separation of zirconium values from hafnium values contained in solution.

It is also an object of this invention to provide a process by which a pure hafnium salt may be recovered from a solution containing zirconium and hafnium salts.

It was found that, when an aqueous nitric acid solution of a hafnium-contaminated zirconium chloride was contacted with tributyl phosphate, the zirconium chloride was taken up by the tributyl phosphate to a degree of a distribution factor for the zirconium (organic/aqueous) of 5. This finding was utilized in devising the process of this invention.

The process of this invention comprises contacting an aqueous liquid and a substantially water-immiscible alkyl phosphate liquid, one of said liquids containing the zirconium and hafnium salt mixture, whereby the zirconium salt is held by an alkyl phosphate extract phase while the hafnium salt is held by the aqueous liquid, and separating said extract phase from said aqueous liquid.

In order to obtain satisfactory results, it is necessary that the aqueous solution contains free nitric acid. An acidity range of from 3 to 5 N is the preferred concentration for the nitric acid. While the nitric acid functions as a so-called salting-out agent and its presence alone brings about satisfactory results, the addition of other salting-out agents is often beneficial. Water-soluble nitrates, such as ammonium nitrate, sodium nitrate, potassium nitrate, lithium nitrate, calcium nitrate, strontium nitrate, magnesium nitrate, lanthanum nitrate, manganese nitrate, aluminum nitrate, or a mixture of any of these nitrates, have been found suitable. Calcium nitrate was the preferred salting-out agent when used in connection with nitric acid; in this case a concentration of about 3 M of each gave the very best results.

While tributyl phosphate was the preferred alkyl phosphate for the extraction, other water-immiscible alkyl phosphates were also found suitable. Such other alkyl phosphates, for instance, are trihexyl phosphate, trioctyl phosphate, octadecyl hydrogen phosphate, dioctyl phenyl phosphonate, didecyl phenyl phosphonate, and dihexyl phenyl phosphonate.

In order to maintain a practically constant concentration of acid and salting-out agent during the extraction step, it is advisable to saturate the organic extractant with the nitrates prior to its use. This solvent "equilibration" may be carried out, for instance, by contacting the alkyl phosphate liquid with an equal volume of an aqueous solution 6 N in nitric acid and 1.5 M in calcium nitrate. The aqueous solution remaining after equilibration, which usually is about 3.5 N in nitric acid, may be used as scrub solution in the process of this invention as will be described later.

Some of the alkyl phosphates have a high viscosity and a high specific gravity which make separation of the aqueous phase from the solvent phase difficult. In such cases, it has been found advantageous to dilute the solvent with a less viscous organic material so that separation of the phases is facilitated. For instance, tributyl phosphate is preferably used in diluted form. The diluents should preferably have a specific gravity of less than 1; suitable diluents for use with alkyl phosphates are: diethyl ether; diisopropyl ether; dibutyl ether, hydrocarbons, such as hexane, n-heptane, n-octane, the n-alkanes with twelve, thirteen or fourteen carbon atoms, and methylcyclohexane; carbon tetrachloride has also given good results. A diluent, which also has been successfully used, is a naphtha having a specific gravity of 0.75, a boiling point of 167°— 180° F. and a flash point of 120° F. It is sold under the trade name "Varsol." A mixture of any of the diluents enumerated above may also be used. The preferred mixture for the process of this invention was one containing 60% by volume of tributyl phosphate and 40% of dibutyl ether.

The effect of a diluent on the separation efficiency is illustrated in Table I where experiments are summarized which were carried out with tributyl phosphate alone or tributyl phosphate containing varying amounts of dibutyl ether. The aqueous solution used for these tests was 0.5 M in zirconyl chloride 2% of which were hafnyl chloride, and it contained calcium nitrate and nitric acid in concentrations of 2 M and 6 M, respectively. Equal volumes of extractant mixture and aqueous solution were employed.

TABLE I

| Percent Tributyl Phosphate | $K_{Zr}$* | $K_{Hf}$* | $\dfrac{K_{Zr}}{K_{Hf}}$ | Percent Hf in Extracted Zr |
|---|---|---|---|---|
| 20 | 0.84 | 0.043 | 19.6 | 0.21 |
| 40 | 2.23 | 0.126 | 17.8 | 0.40 |
| 60 | 5.99 | 0.34 | 17.8 | 0.76 |
| 80 | 21.1 | 1.14 | 18.6 | 1.35 |
| 100 | 50.7 | 3.81 | 13.3 | 1.80 |

*$K = \dfrac{\text{concentration in organic phase}}{\text{concentration in aqueous phase}}$ The results show that by the use of a diluent a better separation ($K_{Zr}/K_{Hf}$) is obtained.

After the contact of the aqueous solution with the extractant, the phases formed are allowed to settle. The organic phase is then separated from the aqueous phase and thereafter advantageously washed or "scrubbed" with an aqueous medium, the scrub solution, for the removal of any hafnium which might have been coextracted with the zirconium. This scrub solution suitably has a composition similar to that of the aqueous starting or "feed" solution as to acid and concentration of other salting-out agents. The aqueous solution remaining after the equilibration of the solvent, as has been described above, is very well suited for the use as a scrubbing agent.

The organic extract phase is then treated for the recovery of the enriched or purified zirconium. This may be done by the so-called back extraction, which means by contacting the organic solution with an aqueous medium that has a higher absorption affinity for the zirconium than has the alkyl phosphate. Water or very dilute nitric acid have this property and are ideal agents for this purpose. In the case of the use of water, a volume flow ratio for the water to the solvent of from 0.8 to 1 has been found best. The zirconium may then be recovered from the aqueous solution obtained by any means known to those skilled in the art, for instance by precipitating it as the oxide.

It has been found in a few instances that the phase separation becomes more difficult and requires a longer period of time after repeated use of the solvent. This can be readily overcome by periodically regenerating the solvent whenever necessary, for instance by washing it with about an equal volume of approximately 1 M sodium hydroxide followed by neutralization with nitric acid and washing with water until the solvent is free of salts. Treatment with sodium carbonate solution has also been found satisfactory.

It is obvious that by the process of this invention the zirconium purification and recovery is not the only result but that also a relatively pure hafnium product is obtained at the same time. The process of this invention also lends itself very well to the separation of hafnium and zirconium values which are originally contained in an alkyl phosphate solution. This is illustrated by the following example.

EXAMPLE I

A tributyl phosphate solution, referred to hereinafter as feed solution, which had been prepared from a technical grade zirconium nitrate that contained 2.5% hafnium nitrate, was treated with an aqueous medium for the selective back extraction of hafnium. For this purpose 1 ml. of concentrated nitric acid and 20 ml. of an aqueous solution of 8 N in ammonium nitrate and 0.16 N in nitric acid were added to 20 ml. of the feed solution. The mixture was stirred for 4 minutes and then allowed to settle for 2 minutes. The aqueous phase was then separated from the tributyl phosphate phase. The latter was scrubbed 7 times, each time with 20 ml. of an aqueous solution 8 N in ammonium nitrate and 0.16 N in nitric acid.

Thereafter the organic phase was treated for the back extraction of zirconium. For this 20 ml. of water were used for each stripping stage, and 5 stages were applied; each time stirring was carried out for 4 minutes, and the settling time was 2 minutes. The 5 aqueous extracts were combined and diluted with water so as to obtain a total quantity of 100 ml.

25 ml. of this total extract were evaporated to dryness with hydrochloric acid, without decomposition of the chloride, and this step was repeated 4 times. The final dry product was then dissolved in hydrochloric acid and water. An analysis of the aqueous zirconium solution thus obtained showed a hafnium content (based on the zirconium content) of 0.1% which, if compared with the initial content of 2.5% in the feed solution, indicates a satisfactory separation.

In the following, another example is given which illustrates the extraction of zirconium from an aqueous solution. Both these examples are disclosed for illustrative purposes only and not with the intention to have the scope of the invention limited to the details given therein.

EXAMPLE II

An aqueous feed solution 0.5 M in zirconium nitrate containing about 2% hafnium nitrate was extracted with a mixture of 60% by volume of tributyl phosphate and 40% by volume of dibutyl ether. The solvent extractant had been previously saturated with nitric acid. An aqueous scrub solution 2 M in calcium nitrate and 5 M in nitric acid was used. Three experiments were carried out in a continuous countercurrent manner, each using a different flow rate for the organic extract mixture. The results of these experiments are compiled in Table II.

*Table II*

|  | Flow ratio, scrub:feed: extractant | Yield of Zr in extract phase, percent | p.p.m.[1] Hf in the Zr | Percent Hf in raffinate (of total Hf+Zr) |
|---|---|---|---|---|
| Expt. No. 1 | 2:3:3 | 70 | <100 | 7 |
| Expt. No. 2 | 2:3:4 | 93 | <100 | 25 |
| Expt. No. 3 | 2:3:5 | 99 | <100 | 80 |

[1] Lower limit of determination 100 p.p.m.

Well known extraction procedures and apparatus may be used in carrying out the process of this invention. Thus, the extraction steps may be effected by the use of batch, continuous batch, batch countercurrent or continuous countercurrent methods. An especially efficient extraction is obtained by the use of the continuous countercurrent method. In all cases, the ratio of liquid organic solvent to initial aqueous solution may vary widely, e.g. from 1:10 to 10:1, and the optimum ratio will depend upon the particular organic solvent and the concentrations used. The organic solvent may be either the dispersed phase or the continuous phase; however, the former is the preferred type.

It will be understood that this invention is not to be limited to the details given herein but that it may be modified within the scope of the appended claims.

What is claimed is:

1. A process of separating zirconium values from hafnium values contained in an aqueous nitric acid solution as the nitrates comprising contacting said aqueous solution with a substantially water-immiscible alkyl phosphate whereby the zirconium values are taken up by an alkyl phosphate extract phase while the hafnium values remain in the aqueous solution, and separating the extract phase from an aqueous phase.

2. The process of claim 1 wherein the nitric acid concentration ranges from 3 to 5 N.

3. The process of claim 1 wherein the aqueous solution contains a water-soluble nitrate as a salting-out agent.

4. The process of claim 3 wherein the water-soluble nitrate is ammonium nitrate.

5. The process of claim 3 wherein the water-soluble nitrate is calcium nitrate.

6. The process of claim 3 wherein the aqueous solution is about 3 M in nitric acid and about 3 M in calcium nitrate.

7. The process of claim 1 wherein the alkyl phosphate is tributyl phosphate.

8. The process of claim 1 wherein the alkyl phosphate is mixed with a substantially water-immiscible organic diluent that has a specific gravity of less than 1.

9. The process of claim 8 wherein the diluent is dibutyl ether.

10. The process of claim 8 wherein 60% by volume of tributyl phosphate are mixed with 40% by volume of dibutyl ether.

11. A process of separating zirconium values from hafnium values contained in an aqueous nitric acid solution as the nitrates comprising contacting said aqueous solution with a substantially water-immiscible alkyl phosphate whereby the zirconium values are taken up by an alkyl phosphate extract phase while the hafnium values remain in the aqueous solution, separating the extract phase from an aqueous phase, and washing said extract phase with an aqueous solution of nitric acid and nitrate.

12. A process of separating zirconium values from hafnium values contained in an aqueous nitric acid solution as the nitrates comprising contacting said aqueous solution with a substantially water-immiscible alkyl phosphate whereby the zirconium values are taken up by an alkyl phosphate extract phase while the hafnium values remain in the aqueous solution, separating the extract phase from an aqueous phase, washing said extract phase with an aqueous solution of nitric acid and nitrate, and contacting said washed extract phase with water whereby the zirconium values are back extracted into the water and the alkyl phosphate is regenerated.

13. A process of recovering hafnium values from aqueous nitric acid solutions containing hafnium and zirconium values in the form of the nitrates comprising contacting said aqueous solution with a substantially water-immiscible alkyl phosphate whereby the zirconium values are taken up by an alkyl phosphate extract phase while the hafnium values remain in the aqueous solution, and separating the extract phase from an aqueous phase.

14. A process of separating zirconium values from hafnium values contained in an aqueous nitric acid solution as the nitrates comprising contacting said aqueous solution with a substantially water-immiscible solvent mixture consisting of tributyl phosphate and dibutyl ether whereby the zirconium values are taken up by a tributyl phosphate extract phase while the hafnium values remain in the aqueous solution, and separating the extract phase from an aqueous phase.

15. The method of treating a substance containing zirconium and hafnium which comprises forming from said substance an aqueous and acid solution of zirconium and hafnium, placing said solution in contact with a solvent consisting at least chiefly of an alkyl phosphate, whereby said solvent extracts zirconium from said aqueous solution, whereas hafnium remains therein, and removing zirconium and hafnium from said solvent and said solution respectively after they have been thus placed in contact with each other.

16. A method according to claim 15 in which the solvent consists chiefly of butyl phosphate.

17. A method according to claim 15 in which the solvent consists chiefly of tri-octyl phosphate.

References Cited in the file of this patent

UNITED STATES PATENTS 2,578,623     Asselin _____ Dec. 11, 1951

OTHER REFERENCES

Warf: U.S. Atomic Energy Commission declassified document No. AECD–2524, August 7, 1947, declassified March 11, 1949, 10 pages.

Weil: "Chromatographic Technology in Radioisotope Separation," Atomics, vol. 1, No. 17, pages 345–356, 360, particularly page 350 (December 1950).